(12) United States Patent
Toss

(10) Patent No.: US 10,583,610 B2
(45) Date of Patent: Mar. 10, 2020

(54) DEVICE FOR WELDING PLASTIC FILMS BY MEANS OF HOT GAS

(71) Applicant: TOSS GmbH & Co. KG, Alten-Buseck (DE)

(72) Inventor: Ramon Toss, Alten-Buseck (DE)

(73) Assignee: TOSS GmbH & Co. KG, Alten-Buseck (DE)

( * ) Notice: Subject to any disclaimer, the term of this patent is extended or adjusted under 35 U.S.C. 154(b) by 85 days.

(21) Appl. No.: 15/844,709

(22) Filed: Dec. 18, 2017

(65) Prior Publication Data

US 2018/0169959 A1 Jun. 21, 2018

(30) Foreign Application Priority Data

Dec. 16, 2016 (DE) .................. 10 2016 124 714

(51) Int. Cl.
*B29C 65/10* (2006.01)
*B29C 65/00* (2006.01)
*B29C 65/74* (2006.01)
*F24H 3/04* (2006.01)

(52) U.S. Cl.
CPC ............ *B29C 65/103* (2013.01); *B29C 65/10* (2013.01); *B29C 65/7471* (2013.01); *B29C 66/1122* (2013.01); *B29C 66/40* (2013.01); *B29C 66/41* (2013.01); *B29C 66/7392* (2013.01); *B29C 66/73921* (2013.01); *B29C 66/80* (2013.01); *B29C 66/8167* (2013.01); *F24H 3/0423* (2013.01)

(58) Field of Classification Search
CPC ... B29C 65/10; B29C 65/7471; B29C 65/103; B29C 66/1122; B29C 66/40; B29C 66/41; B29C 66/80; B29C 66/8167
See application file for complete search history.

(56) References Cited

U.S. PATENT DOCUMENTS

| 3,380,229 A | * | 4/1968 | Nelson | ............... B29C 66/1122 53/376.7 |
| 3,412,234 A | * | 11/1968 | Otavka | .................... F24C 7/10 219/406 |
| 3,606,727 A | * | 9/1971 | Davis | ...................... B29C 65/10 53/52 |
| 5,554,252 A | * | 9/1996 | Foran | ...................... B29C 65/10 156/311 |
| 6,134,387 A | * | 10/2000 | Toss | ....................... B29C 65/10 156/304.6 |

FOREIGN PATENT DOCUMENTS

DE 2135057 1/1972

* cited by examiner

*Primary Examiner* — Philip C Tucker
*Assistant Examiner* — Jimmy R Smith, Jr.

(57) ABSTRACT

The invention relates to a device for the preferably continuous welding of plastic films by means of hot gas with at least one tubular body through which an electric current flows for the heating of the hot gas, wherein the device comprises at least one gas inlet opening (6, 106) and a plurality of gas outlet openings (12, 112) arranged next to each other, from which hot gas is blown onto the plastic film. It is provided that the at least one gas inlet opening (6, 106) is provided on a main tubular body (4, 104), which stands in gas communication with a plurality of branch tubular bodies (8, 108) at branching points (10, 110), wherein the branch tubular bodies (8, 108) each have at least one gas outlet opening (12, 112) and all the branch tubular bodies (8, 108) have electric current flowing through them.

13 Claims, 4 Drawing Sheets

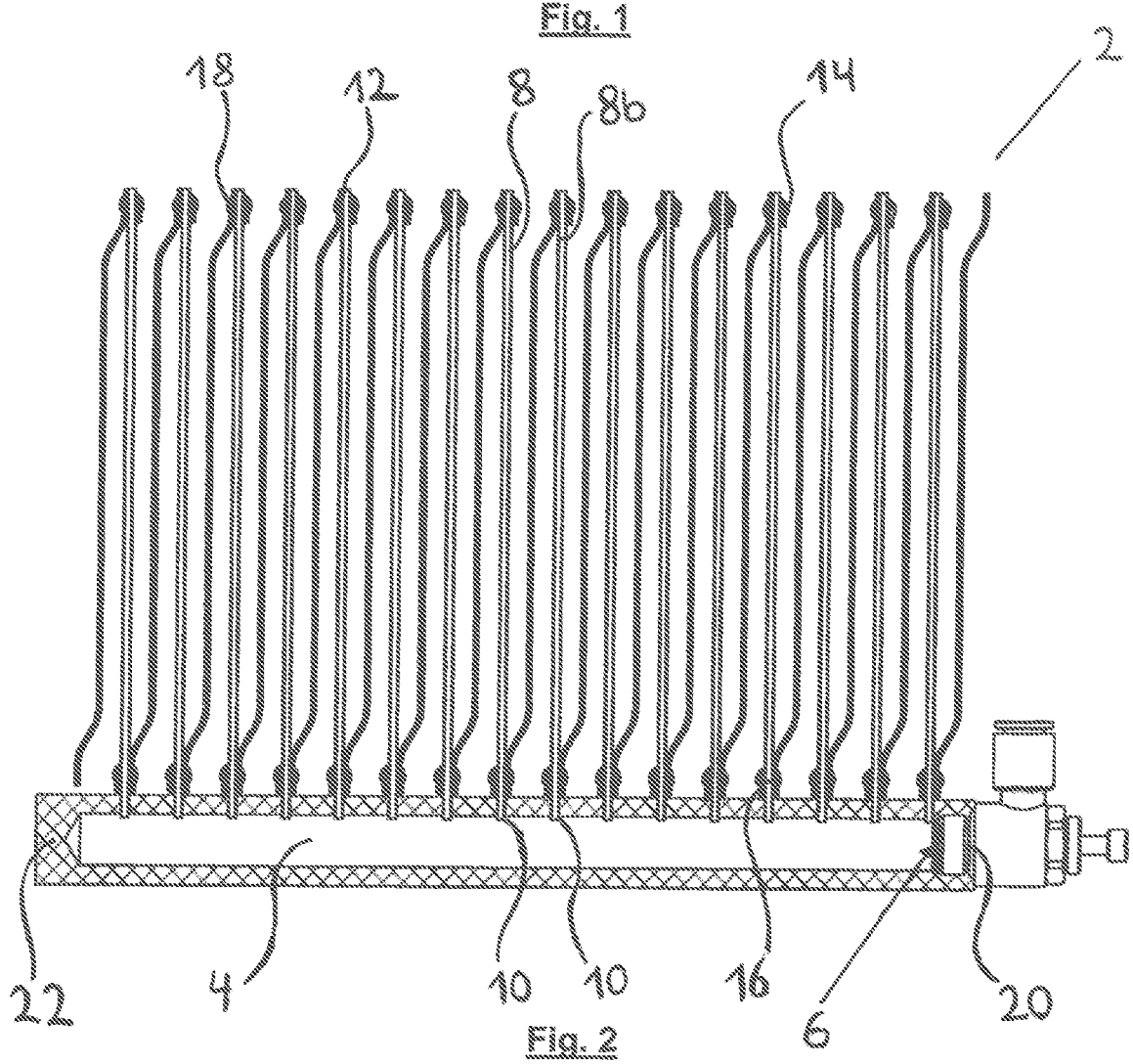
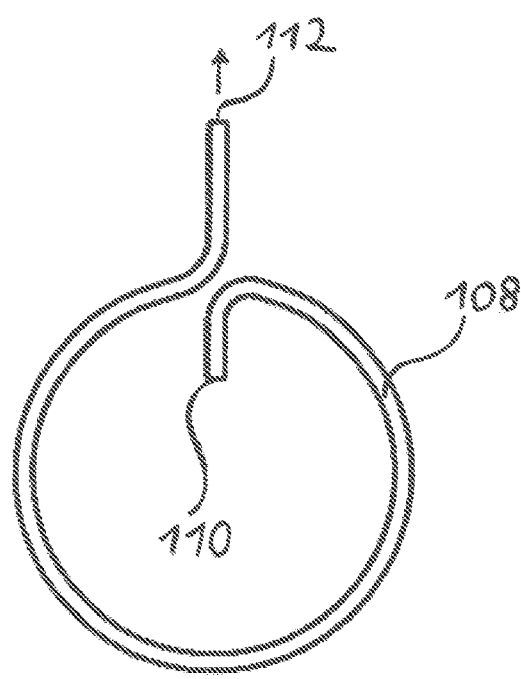

DEVICE FOR WELDING PLASTIC FILMS BY MEANS OF HOT GAS

RELATED APPLICATION

This application claims the benefit of priority of German Patent Application No. DE 10 2016 124 714.6 filed Dec. 16, 2016, the contents of which are incorporated herein by reference in their entirety.

FIELD AND BACKGROUND OF THE INVENTION

The invention relates to a device for the welding of plastic films by means of hot gas according to the preamble of claim 1.

Such devices generally serve for the continuous welding of thermoplastic films, i.e., the welding is done with a relative movement between device and film. An intermittent operation is also possible, but the air supply is generally switched off during a standstill.

Such a welding device is described in EP 0 743 164 B1. Although the temperature of the hot gas in the specified device can be regulated well, this applies only to the mean temperature of the hot gas flow as a whole. It has been found that the temperature of the hot gas emerging from an outlet opening situated further away from a gas inlet opening has a higher temperature than the hot gas, which is blown through an outlet opening situated closer to a gas inlet. This may result in irregularities during the welding of plastic film. Thus, the temperature of the hot gas at the outlet opening situated close to the gas inlet is not high enough to successfully weld the plastic film. By contrast, an overly high temperature at the gas outlet opening further away from the gas inlet may result in an uncontrolled melting of the plastic film. In addition, an uneven heating of the hot gas results in an overheating of the heating tube in places, so that it may burn through.

Furthermore, such heating tubes are often shaped asymmetrically, as is shown for example in DE 10 2014 010 184 A1. This causes additional path differences traveled by the gas during the heating process inside the heating tube, which intensifies the effect of the different temperatures of the emerging hot gas.

The problem, which the invention proposes to solve is therefore to provide a device with which the gas can be evenly heated and with which the temperature of the emerging gas can be adjusted precisely.

SUMMARY OF THE INVENTION

The main features of the invention are indicated in the characterizing part of claim 1. Embodiments are the subject matter of claims 2 to 14.

In a device for the welding of plastic films by means of hot gas with at least one tubular body through which an electric current flows for the heating of the hot gas, wherein the device comprises at least one gas inlet opening and a plurality of gas outlet openings arranged next to each other, from which hot gas is blown onto the plastic film, the invention therefore provides that the at least one gas inlet opening is provided on a main tubular body, which stands in gas communication with a plurality of branch tubular bodies at branching points, wherein the branch tubular bodies each have at least one gas outlet opening and all the branch tubular bodies have electric current flowing through them.

Instead of a single tubular body through which a flow passes, as is known in the prior art, there are now provided a main tubular body and a plurality of branch tubular bodies. The branch tubular bodies are connected in terms of flow to the main tubular body, so that the gas entering through the at least one gas inlet opening of the main tubular body branches into the branch tubular bodies, flows through them, and is heated there. The branching points, as connection points between main tubular body and branch tubular bodies, thus function as gas inlet openings of the branch tubular bodies.

The gas, which is generally air, is heated substantially in the branch tubular bodies in the design according to the invention, and these each have at least one, especially exactly one, gas outlet opening. The gas flowing from the main tubular body into the branch tubular bodies at first has a uniform temperature and is led in each case across a defined distance in the branch tubular bodies. In this way, the hot gas emerging at all the gas outlet openings has a uniform temperature, which can be adjusted very precisely.

The relatively very small cross section of the branch tubes also allows a more effective heating of the air flow thanks to a better heat transfer, while maintaining the central air inlet at the main tube.

The plastic film being welded is moved at a distance from the gas outlet openings and the hot gas is blown from the at least one respective gas outlet opening of the branch tubular bodies onto the plastic film being welded.

The temperature of the emerging hot gas is determined by the current strength, geometry, and gas flow rate.

In one preferred embodiment, all the gas outlet openings of the branch tubular bodies are arranged substantially on one axis. In this way, the plastic film being welded is blown upon evenly in a defined region and thereby welded. For example, the gas outlet openings can be arranged in a line or in a band. With a band-shaped arrangement, which may require additional gas outlet openings, a broader welded seam is made possible. In both a line-shaped and a band-shaped arrangement of the gas outlet openings of the branch tubular bodies, the gas outlet openings preferably have a common gas blowing direction, so that the hot gas is blown in a targeted manner onto the plastic film being welded.

Preferably, the gas outlet openings of the branch tubular bodies are arranged such that all the gas outlet openings have the same distance from the plastic film being welded. This ensures an even welding of the film, because the hot gas impinges everywhere on the plastic film with the same temperature.

In one preferred embodiment, the at least one gas outlet opening of the respective branch tubular body is arranged at an end opposite the branching point. In particular, it is provided that the gas outlet opening is arranged at an end face of the branch tubular body situated opposite the branching point. The cross section of the branch tubular body in this case forms the outlet opening in a simple design, whereby a particular laminar air flow is also produced, so that a better focusing of the air flow in the direction of the film is made possible, as compared to simple perforations in a thin wall.

Thanks to the plurality of branch tubular bodies, the number of which may be adapted variably to the respective requirements, a rapid processing during the welding is made possible. For the welding of the layers of film moved past the device, the heating to the melting temperature during the movement is critical. The number of branch tubular bodies or the distance of the zone receiving the hot gas flow enables an adapting to the requirements of the continuous welding.

This may be designed exactly long enough to achieve a predetermined welding speed. Each additional branch tubular body accomplishes a steplike and defined boosting of the thermal input into the layers of film. For example, if many branch tubular bodies are provided, each with at least one gas outlet opening, the plastic film being welded can be moved past the device at high speed. In this way, a higher cadence can be achieved.

As is provided according to the invention, the branch tubular bodies receive a flow of electric current, the current strength being controlled in dependence on its resistance, which changes with the temperature. The branch tubular bodies function as temperature sensors in this case. The current strength and thus the temperature are preferably regulated with the aid of an external regulator.

Preferably, the main tubular body and the branch tubular bodies have a round, oval, rectangular, square, or polygonal cross section. In this way, the shape of the main tubular body and/or the branch tubular bodies can be adapted flexibly to the conditions and the spatial boundaries within an existing layout. With a round or oval cross section, the most uniform possible heating of the gas in the tubular body, especially in the branch tubular bodies, can be achieved, without them becoming locally overheated.

In a preferred embodiment, all the branch tubular bodies are substantially identical in shape. In this way, it can be easily arranged for the hot gas to have the same gas outlet temperature at all the gas outlet openings. Thus, the plastic film can be welded each time with the same temperature across the region in which branch tubular bodies are arranged each with at least one gas outlet opening.

Preferably, the branch tubular bodies and/or the main tubular body form a pressure reservoir. In this way, it is assured that all the branch tubular bodies heating the gas receive a uniform flow. When the gas flows uniformly through all the branch tubular bodies and thus is heated uniformly, the emerging hot gas has a defined uniform temperature across all gas outlet openings.

It is especially preferable for at least the main tubular body to form a pressure reservoir. In this way, the gas is moved in the main tubular body with excess pressure and all the branch tubular bodies receive a uniform flow of gas. Thus, the gas is heated evenly in all the branch tubular bodies and the temperature of the emerging hot gas is precisely adjustable. For example, a pressure reservoir can be formed in that the main tubular body has a larger internal volume than a total internal volume of the provided branch tubular bodies.

The function as a pressure reservoir, especially that of the main tubular body, is assisted by constrictions in the form of throttle points. Preferably, these are provided as intake air throttles in the region of the branching points and/or as exhaust air throttles at the gas outlet openings. An increased pressure is formed inside the device, producing a uniform gas outflow.

In a preferred embodiment, the branching points which connect the main tubular body to the branch tubular bodies are disposed in a circumferential wall of the main tubular body. This constitutes an arrangement which can be produced in a simple and economical fashion and which furthermore assures a precise temperature of the emerging hot gas.

The main tubular body, which may be a pipe-shaped body, preferably has a gas inlet opening at one end face and is formed closed off at an oppositely situated pipe end. This arrangement is easy to produce.

In an alternative embodiment, the gas inlet opening may be formed in the circumferential wall of the main tubular body, and then both pipe ends are preferably formed closed off.

Alternatively, the main tubular body can also be formed as a closed circuit with a gas inlet opening in the circumferential wall. This arrangement may be advantageous, for example, when the available space in a welding machine only allows one side gas inlet in the circumferential wall or there is not enough room for an elongated main tubular body.

Thanks to the different design possibilities of the device, especially of the main tubular body, a flexible approach is possible to the space relations within welding layouts, especially existing layouts.

Preferably, all the provided branch tubular bodies are arranged on one axis in the circumferential wall of the main tubular body. This configuration enables a simple manufacture of the device and a uniform temperature control of the hot gas.

In a preferred embodiment, the plurality of branch tubular bodies are arranged substantially parallel with each other. In this way, an easily and economically manufacturable and space-saving device for the welding of plastic films is made possible.

Preferably, the at least one gas outlet opening of a branch tubular body has a substantially round, oval or slot-like cross section. The oval or slot-like gas outlet openings may be arranged in this case transversely, lengthwise or diagonally to the direction of movement of the plastic film being welded.

The hot gas flow onto the plastic film can be regulated by the shape of the gas outlet opening. For example, if a very narrow welded seam is required, slot-like gas outlet openings are preferably to be provided, whose slot is oriented in the direction of movement of the plastic film.

In a preferred modification, the branch tubular bodies have a curved shape, wherein the branch tubular bodies in particular are arranged curved in a spiral around the main tubular body. In this case, the branch tubular bodies are moved at a spacing from each other and from the main tubular body. This prevents the occurrence of a short circuit by a direct contact of two components with current flowing through them. Thanks to this modification, the most space-saving arrangement possible can be achieved.

In a preferred embodiment, the branch tubular bodies through which electric current is flowing are electrically connected in series. This series circuit involves a consecutive electrical connection of two or more components in a circuit, so that they form a current path. It is advantageous in the case of a series electrical circuit of the branch tubular bodies that a relatively high overall voltage can be used on account of an overall increased resistance in order to achieve the current flow in the individual branch tubular bodies needed for the heating.

In an alternative embodiment, it may be provided that the plurality of branch tubular bodies through which electric current is flowing are electrically connected in parallel. Although here as well each branch tubular body requires a relatively low partial current, the partial currents add up for a parallel circuit in the power supply line to provide a high overall current for an appropriately dimensioned power supply. It is advantageous in the case of a parallel circuit that a lower overall voltage is required than for a comparable series circuit.

In a preferred modification, the device has a modular design, wherein each module has at least one branch tubular body through which electric current is flowing with at least one gas outlet opening, at least one branching point and at least one section of the main tubular body. Thanks to a modular design, a flexible approach is possible to the required length of the device and the required number of branch tubular bodies with at least one gas outlet opening, especially one gas outlet opening. Thanks to adapting the number of modules, the length of the welding region can be adapted flexibly and thus for example the speed of the plastic film welding can be increased and/or an increased heat demand can be handled, for example in the case of welding thicker films.

With each module not only is another branch tubular body provided with at least one gas outlet opening, but also a section of a main tubular body, so that the device can be adapted in its overall construction to the particular requirements.

Preferably, several interconnected modules form a main tubular body. The sections of the main tubular body of several modules form in this case the main tubular body. A first module, which is connected to a gas supply, forms in this case the gas inlet opening of the common main tubular body.

Preferably, several modules are connected together, wherein at least one connection element is provided, which joins together at least two modules each time. The connection element may be fashioned in the form of a screw and a mating thread, so that a screwing together of at least two modules is made possible.

In a preferred embodiment, the connection element is formed as a rod, so that the modules can be pushed onto this rod. In particular, the rod has a thread at its end, which secures the modules. In this way, a connection element which joins together the modules is made possible. Furthermore, rods as connection elements can be easily adapted to the required length of the device.

In an alternative embodiment, it is provided that the modules are joined together in an integrally bonded manner. This may occur, for example, by gluing or welding. Also in this way a flexible approach to the requirements of the device is possible in terms of the number of branch tubular bodies and gas outlet openings.

In a preferred embodiment, it is provided that the connection elements form an electrical circuit with the respective branch tubular bodies of the modules, wherein the connection elements may serve for example for voltage feedback. In this way, an easy manufacture of the individual modules and the device is possible, wherein a closed circuit between several modules can be made possible in an easy manner.

In a preferred modification, each module has an electrical insulation layer. This insulation layer for example separates at least one section of the main tubular body into two regions electrically insulated from each other. Now, if several modules are joined together, an electrical series circuit of the modules, especially the branch tubular bodies of the modules, can very easily be made possible. Thus, the insulation layer separates the poles, in the form of the electrical input line and output line, and thereby enables a current flow through the branch tubular bodies in the form of an electrical series circuit.

Preferably, at least one end module is provided. The end module for example corresponds to a module with a gas-tight closed section of a main tubular body at one side. This makes possible a device having a modular design and a main tubular body into which gas flows, being then divided across branching points and flowing through the branch tubular bodies, in which the gas is heated.

Alternatively, the end module only has a cover, which may close off the main tubular body at least at one end.

In an alternative embodiment, two end modules may be provided. In this way, a main tubular body is formed which has two closed ends on the tubular body, while a gas inlet opening may be provided in one circumferential wall of the main tubular body.

In a preferred embodiment, the end module closes the electrical circuit. The end module for example enables the voltage feedback in the case of an electrical series circuit of the branch tubular bodies.

Preferably, the end module secures the preceding modules on the at least one connection element. If the connection element for example is fashioned as a rod, on which the individual modules are placed, the end module constitutes a fastening of the modules on the connection element. In a preferred embodiment, the fastening of the end module on the connection element can occur by a thread in the end region of the connection element and a mating thread on the end module.

BRIEF DESCRIPTION OF THE SEVERAL VIEWS OF THE DRAWINGS

Further features, details and benefits of the invention will emerge from the wording of the claims as well as the following description of exemplary embodiments with the aid of the drawings. There are shown:

FIG. 1 a schematic cross-sectional view of a device according to the invention, FIG. 2 a schematic cross-sectional view of one embodiment of a branch tubular body, FIG. 3 a schematic side view of the branch tubular body in FIG. 2, FIG. 4 a perspective view of a module to construct a device according to the invention, FIG. 5 a perspective side view of a modular design embodiment of a device according to the invention, FIG. 6 a perspective cross-sectional view of the embodiment shown in FIG. 5, FIG. 7 an exploded representation of the embodiment of a modular design device according to the invention as shown in FIG. 5 and FIG. 6.

DESCRIPTION OF SPECIFIC EMBODIMENTS OF THE INVENTION

Figure 3:
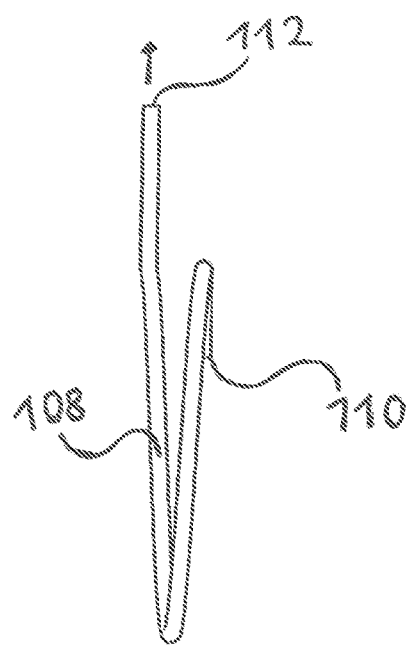

FIG. 1 shows a device 2 according to the invention with a main tubular body 4 with a gas inlet opening 6. The main tubular body 4 stands in gas communication with a plurality of branch tubular bodies 8 at branching points 10. The branch tubular bodies 8 each have at least one, especially exactly one, gas outlet opening 12.

The branch tubular bodies 8 receive a flow of electric current, by which they become heated. The gas flowing through them takes up the heat and is blown as hot gas onto a plastic film moved at a distance from the gas outlet openings 12. That is not shown here.

FIG. 1 shows a series circuit of the branch tubular bodies 8, wherein each time a branch tubular body end 14 of one branch tubular body 8 is electrically connected to a branch tubular body beginning 16 of the neighboring branch tubular body 8b. In this way, the branch tubular body 8 receives a flow of current over almost its entire length, so that the gas can be heated in the best possible way.

Preferably, the electrical contacts 18 are arranged each time at opposite ends of the respective branch tubular body 8. In this way, the flow path of the gas in the branch tubular body 8 can be used for the heating of the gas in the best possible way.

In FIG. 1, the gas inlet opening 6 is arranged at an end face 20 of the main tubular body 4. The opposite end 22 of the main tubular body 4, situated opposite the gas inlet opening 6, is shown here closed off, although other embodiments are also possible.

FIG. 2 and FIG. 3 show another embodiment of the branch tubular bodies 108. Here, the branch tubular body 108 is curved, in particular wound in a spiral. Preferably, the branch tubular body 108 in this embodiment is curved around the main tubular body 104, although the main tubular body 104 is not represented in FIGS. 2 and 3.

FIG. 2 shows a cross-sectional view through the branch tubular body 108. FIG. 3 on the other hand shows a side view of the same branch tubular body 108. In both FIGS. 2 and 3 the gas flows from the main tubular body 104 across the branching points 110 into the branch tubular body 108. These receive a flow of electric current and heat the gas flowing through them. The hot gas emerges through the gas outlet openings 112 of the respective branch tubular body 108 and is blown onto the plastic film being welded. The emerging hot gas is indicated by an arrow. In the embodiment shown here, the branching point 110 and the gas outlet opening 112 are arranged at the respective end faces of the opposite ends of the branch tubular body 108, but other arrangements are also possible.

These curved branch tubular bodies 108 shown in FIGS. 2 and 3 may be used in a permanently mounted device 2, as shown for example in FIG. 1, and in a modular design device 102.

Figure 4:
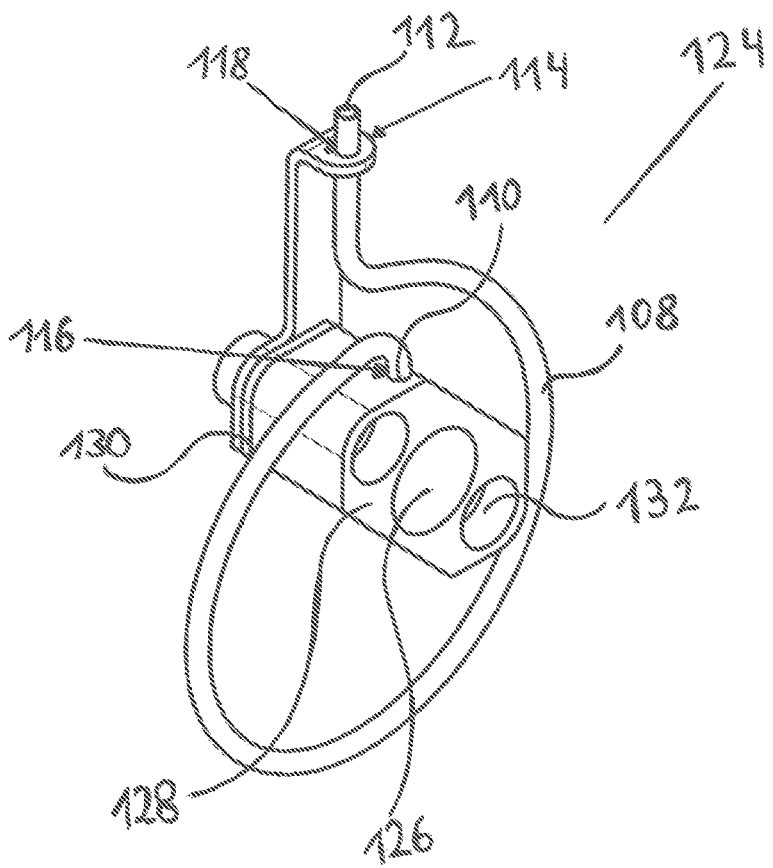

FIG. 4 shows a schematic representation of a module 124 with at least one branch tubular body 108 receiving a flow of electric current with at least one gas outlet opening 112, at least one branching point 110 and at least one section 126 of the main tubular body 104.

The branch tubular body 108 has two poles, so that it can receive a flow of current. The one pole is formed by the circumferential wall 128 of the section 126 of the main tubular body 104 and stands in electrical contact with the branch tubular body beginning 116; the other pole is arranged as an electrical contact 118 in a region of the branch tubular body end 114.

In order to make possible a series circuit, each module 124 has an insulation layer 130, which in each case electrically separates the two poles from each other.

In the embodiment shown, two additional recesses 132 are provided in the circumferential wall 128 of the section 126 of the main tubular body 104. These may serve for the connecting of several modules 124.

Figure 5:
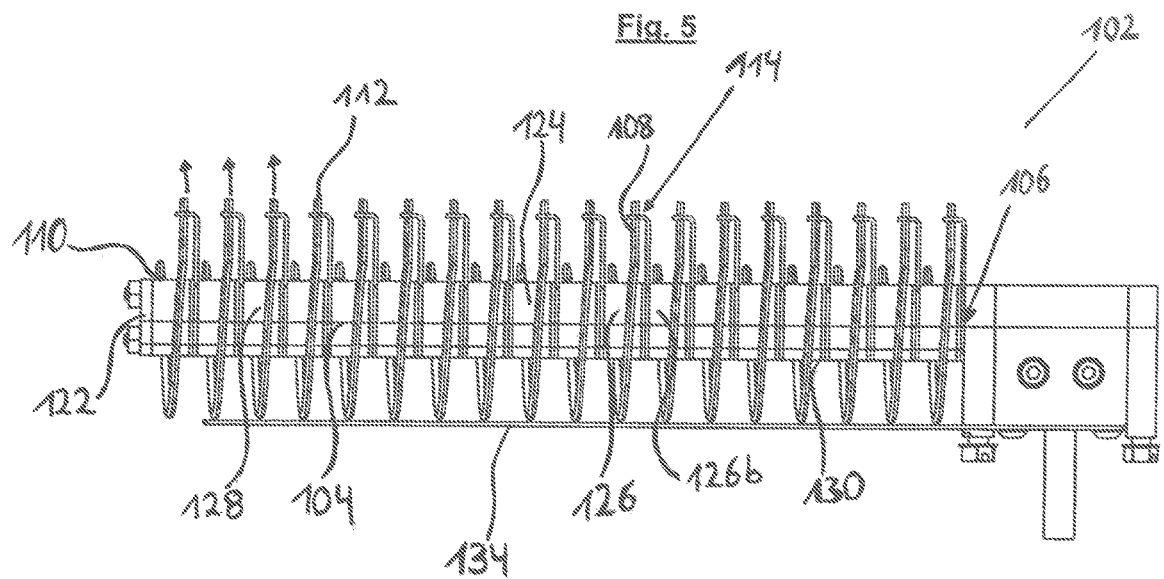

FIG. 5 shows a schematic representation of a top view of one embodiment of a modular design device 102. Here, several of the modules 124 represented in FIG. 4 are joined together.

The main tubular body 104 comprises a gas inlet opening 106 at one end and an opposite closed end 122. The main tubular body 104 receives a flow of gas and is connected to a plurality of branch tubular bodies 108 at branching points 110. The branch tubular bodies 108 are curved in a spiral around the main tubular body 104. The gas flows through the gas inlet opening 106 into the main tubular body 104 and is divided at the branching points 110 among several branch tubular bodies 108. In the branch tubular bodies 108, which receive a flow of electric current, the gas is heated and blown as hot gas through the respective at least one gas outlet opening 112 onto the plastic film being welded. The hot gas is shown symbolically by arrows.

In the embodiment represented in FIG. 5, the branch tubular bodies 108 are joined together in an electrical series circuit. The poles are arranged as described above. The first pole is formed by the circumferential wall 128 of a section 126 of the main tubular body 104. The second pole at the branch tubular body end 114 is electrically connected to the circumferential wall 128 of an adjacent section 126b of the main tubular body 104 of an adjacent module 124. Between the sections 126, 126b of the main tubular body 104 there is provided each time an electrical insulation layer 130.

In the embodiment shown here, the device 102 is mounted on a plate 134, which may serve for the fastening of the device 2 inside a layout and/or the temperature shielding of the device 2 against other components of the layout.

Figure 6:
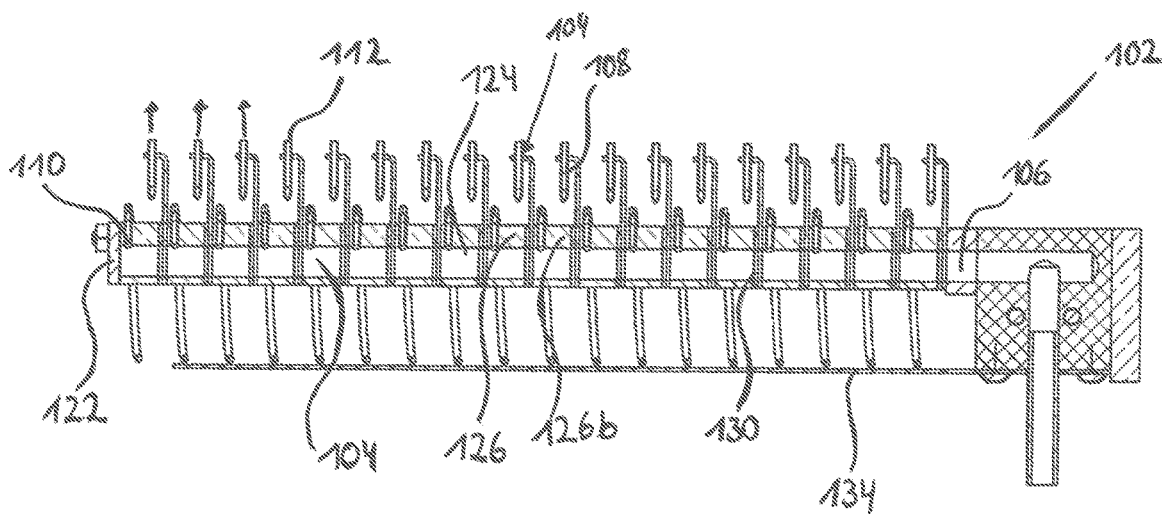

FIG. 6 shows a cross-sectional view of the embodiment of the device 102 according to the invention represented in FIG. 5.

In the modular design embodiment of the device 102 according to the invention as represented in FIGS. 5 and 6, several modules 124 are joined together.

Figure 7:
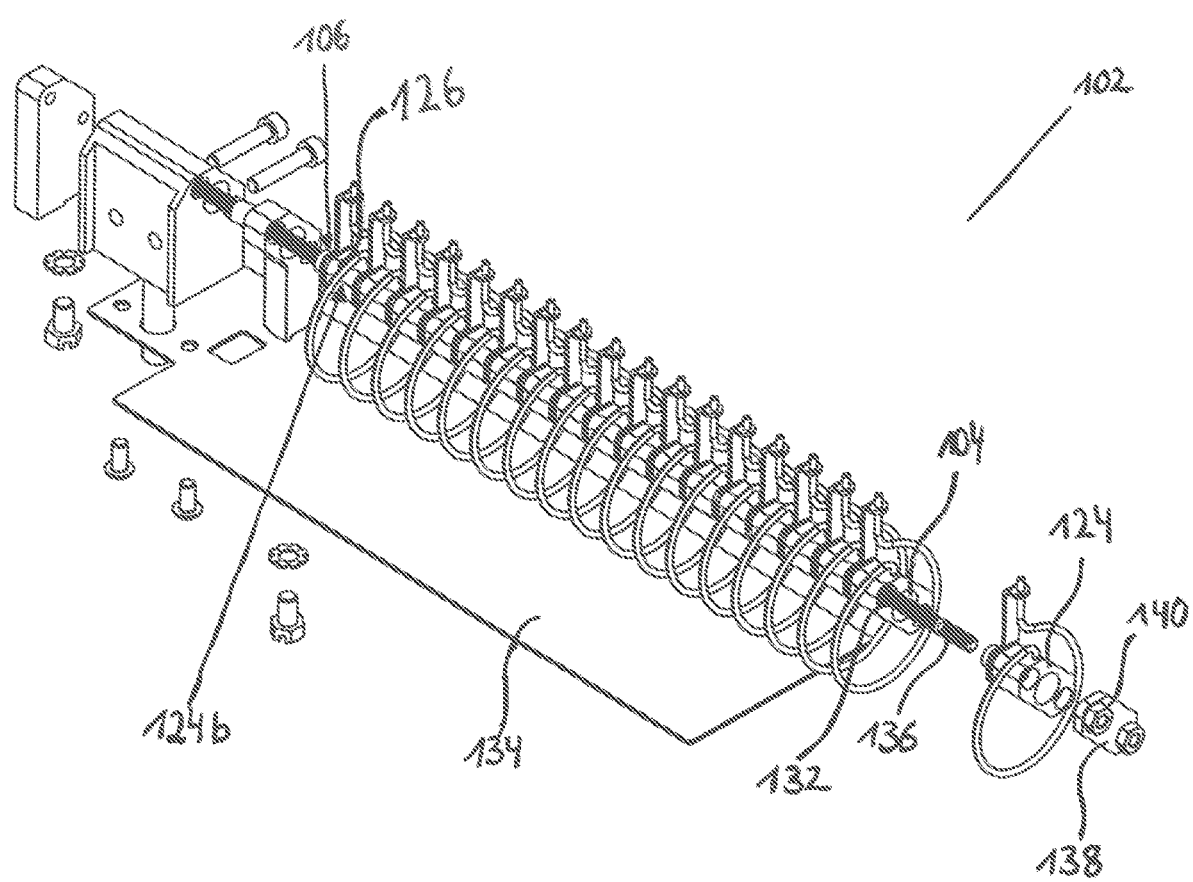

Thus, the modules 124 for example may be mounted on connection elements 136, especially in the form of rods, as shown in FIG. 7.

FIG. 7 shows a schematic exploded representation of the embodiment of a modular design device 102 as represented in FIG. 5 and FIG. 6.

Here, several of the modules 124 represented in FIG. 6 are joined together. The modules 124 are pushed onto connection elements 136 in the form of rods, the connection elements 136 being arranged in the recesses 132. The section 126 of the main tubular body 104 of a first module 124b acts as the gas inlet opening 106. An end module 138 closes off from the outside in a gas-tight manner the main tubular body 104, formed by the sections 126 of the main tubular body 104 of the modules 124. This end module 138 in the embodiment represented is arranged at the end 122 of the main tubular body 104 situated opposite the gas inlet opening 106. A fastening of the end module 138 to the connection elements 136 in the form of rods occurs with the aid of nuts 140.

The device 102 in FIG. 7 has a plate 134. Furthermore, additional fastening means are represented in the form of screws, which can fasten the device 102 in a plastic film welding layout.

The invention is not limited to one of the above-described embodiments, but rather may be modified in various ways.

All of the features and benefits emerging from the claims, the description and the drawing, including structural details, spatial arrangements and method steps, may be essential to the invention both in themselves and also in the most diverse combinations.

LIST OF REFERENCE NUMBERS 2, 102 Device
4, 104 Main tubular body
6, 106 Gas inlet opening
8, 108 Branch tubular body
10, 110 Branching points
12, 112 Gas outlet openings
14, 114 Branch tubular body end
16, 116 Branch tubular body beginning
18, 118 Electrical contact
20, 120 End face of main tubular body 22, 122 Opposite end of main tubular body 4
124 Module
124b First module
126 Section of main tubular body 104
126b Adjacent section of main tubular body 104
128 Circumferential wall of section 126 of main tubular body 104
130 Insulation layer
132 Recesses
134 Plate
136 Connection elements
138 End module
140 Nut

What is claimed is:

1. A device having a modular design for welding of a plastic film by hot gas with at least one tubular body through which an electric current flows for heating of the hot gas, wherein the device comprises at least one gas inlet opening (6, 106) and a plurality of gas outlet openings (12, 112) arranged next to each other, from which hot gas is blown onto the plastic film, the at least one gas inlet opening (6, 106) being provided on a main tubular body (4, 104), which stands in gas communication with a plurality of branch tubular bodies (8, 108) at branching points (10, 110);
   wherein each of the plurality of branch tubular bodies (8, 108) has at least one of the plurality of gas outlet openings (12, 112);
   wherein all of the plurality of branch tubular bodies (8, 108) have electric current flowing through them;
   wherein the main tubular body (4, 104) is formed by a plurality of modules (124) connected to one another by at least one connection element (136) comprising at least one rod;
   wherein each of the plurality of modules (124) has:
      at least one of the plurality of branch tubular bodies (8, 108), through which electric current is flowing,
      at least one branching point (10, 110) through which gas flows from the main tubular body (4, 104), into the at least one of the plurality of branch tubular bodies (8, 108),
      a section (126) of the main tubular body (4, 104), at least one recess for receiving the at least one connection element (136) for establishing a connection with another of the plurality of modules.

2. The device as claimed in claim 1, characterized in that the branch tubular bodies (8, 108) are substantially identical in shape.

3. The device as claimed in claim 1, wherein the branch tubular bodies (8, 108) and/or the main tubular body (4, 104) form a pressure reservoir.

4. The device as claimed in claim 1, wherein the branching points (10, 110) are disposed in a circumferential wall the main tubular body (4, 104).

5. The device as claimed in claim 1, wherein the plurality, of branch tubular bodies (8, 108) are arranged substantially parallel with each other.

6. The device as claimed in claim 1, wherein the at least one gas outlet opening (12, 112) of each branch tubular body (8, 108) has a substantially round, oval or slot-like cross section.

7. The device as claimed in claim 1, wherein the branch tubular bodies (8, 108) have a curved shape, wherein the branch tubular bodies (8, 108) are arranged curved in a spiral around the main tubular body (4, 104).

8. The device as claimed in claim 1, wherein the plurality of branch tubular bodies (8, 108) through which electric current is flowing are electrically, connected in series.

9. The device as claimed in claim 1, wherein the plurality of branch tubular bodies (8, 108) through which electric current is flowing are electrically connected in parallel.

10. The device as claimed in claim 1, wherein the at least one connection element (136) joins together at least two modules (124).

11. The device as claimed in claim 10, wherein the at least one connection element (136) forms an electrical circuit with at least two branch tubular bodies from at least two modules (124).

12. The device as claimed in claim 1, wherein each module (124) has an electrical insulation layer (130).

13. The device as claimed in claim 1, wherein at least one end module (138) is provided.

* * * * *